Feb. 3, 1970 G. REVESZ ET AL 3,493,769
SYSTEM, INCLUDING PULSE SHAPE DISCRIMINATOR FOR
DETECTING FLAWS IN TRANSPARENT MATERIAL
Filed Feb. 15, 1966 2 Sheets-Sheet 1
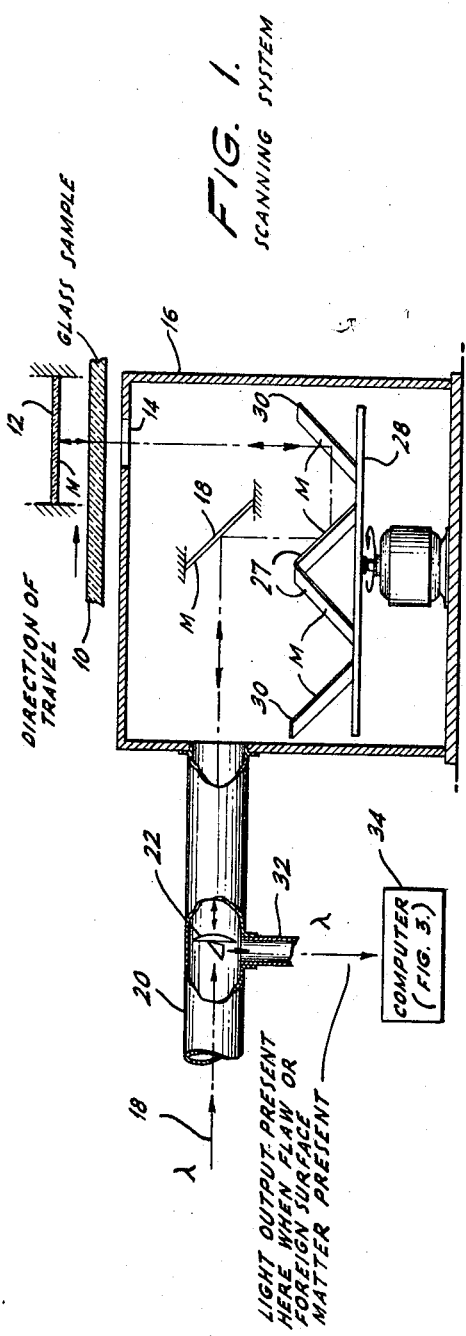
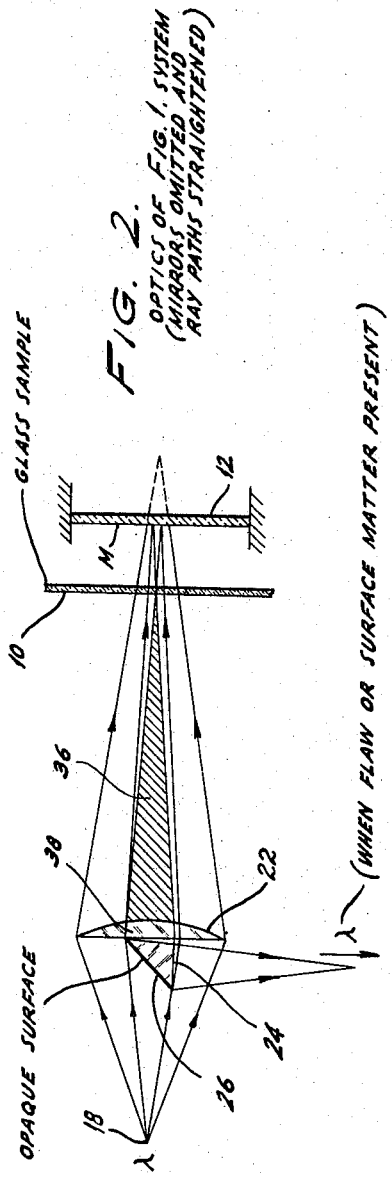
INVENTORS
GEORGE REVESZ
NINO BENNICELLI
BY BRUCE G. MARKS
D. R. Pressman
ATTORNEY

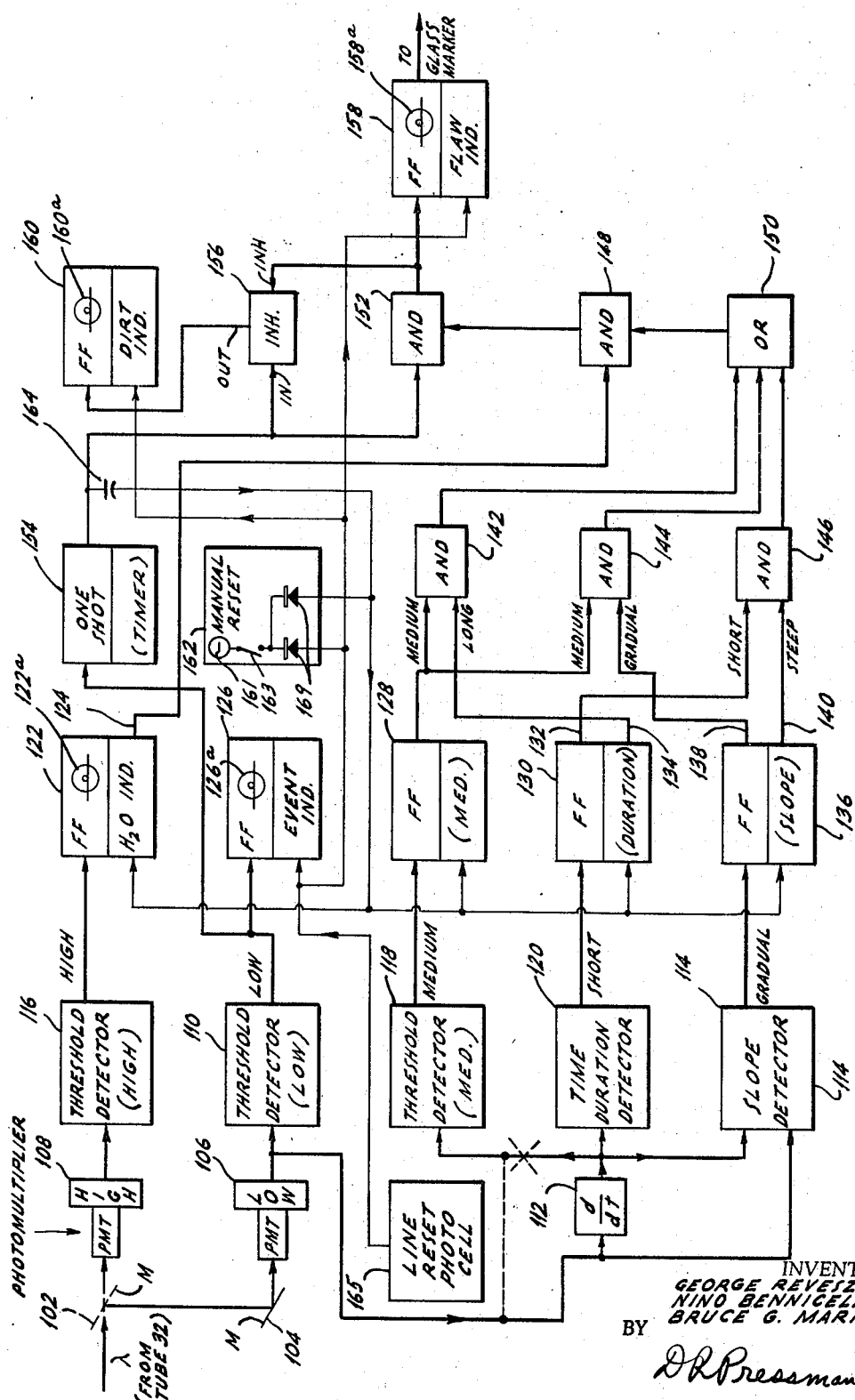

United States Patent Office 3,493,769
Patented Feb. 3, 1970

3,493,769
SYSTEM, INCLUDING PULSE SHAPE DISCRIMINATOR FOR DETECTING FLAWS IN TRANSPARENT MATERIAL
George Revesz, Bala Cynwyd, and Nino Bennicelli and Bruce G. Marks, Lansdale, Pa., assignors to Philco-Ford Corporation, a corporation of Delaware
Filed Feb. 15, 1966, Ser. No. 527,435
Int. Cl. H01j 39/12; G01n 21/30; G06m 7/00
U.S. Cl. 250—214
9 Claims

ABSTRACT OF THE DISCLOSURE

System for detecting flaws in glass, employing a scanner to scan a glass sample with a light beam, an optical system for providing a light pulse if an irregularity in the sample is encountered by the light beam, and a computer to provide a predetermined output, indicating that the irregularity is a flaw in the glass, if an electrical pulse generated in response to the light pulse has a predetermined leading edge slope, duration, and amplitude.

---

This invention relates to an inspection system and more particularly to a system for inspecting transparent material (such as glass) for flaws.

Purchasers of large quantities of glass (e.g., automobile manufacturers, mirror manufacturers, or building contractors) must necessarily inspect all incoming glass for flaws. The most common types of flaws are bubbles, chips, and dirt embedded in the glass. These flaws, when present in a given section of glass, render the same unsuitable for commercial use. In addition to these flaws, defects of a different nature which do not render glass unsuitable for use are usually found in glass which is purchased in large quantities. These defects consist of foreign material on the surface of the glass, e.g., water or dirt. Since such foreign material can be removed easily, it does not render a given section of glass unsuitable for use.

Heretofore inspection of incoming glass was performed manually by inspectors who examined each quantity of glass in detail (100 percent inspection) and marked flaws with a colored crayon or the like. This operation is very costly and it is not entirely reliable due to inspector fatigue and other human factors.

OBJECTS

Accordingly several objects of the present invention are: (1) to provide an automatic system for inspection of transparent material for flaws, (2) to provide an automatic transparent material inspection system which can differentiate between flaws which render a sample of transparent material unsuitable and surface defects which can be removed, thereby to provide a transparent material inspection system having greater reliability and accuracy than any heretofore available. Other objects of the present invention will become apparent from a consideration of the ensuing description thereof.

SUMMARY

According to the present invention flaws in transparent material are recognized by scanning the transparent material with a light beam, providing an electrical signal corresponding to the change produced in the light beam when a flaw is encountered, and providing an appropriate flaw indicator if the magnitude and time versus amplitude waveshape of the electrical signal corespond to empirically predetermined criteria. I.e., if the magnitude of the signal lies within a predetermined amplitude range and exceeds a predetermined duration or has a gradual leading edge slope, or if the signal lies below said predetermined amplitude range but has a relatively steep leading edge, a flaw indication is provided. The presence of water or foreign matter on the surface of the transparent sample is recognized by the presence of a signal having other predetermined characteristics.

DRAWINGS

FIG. 1 shows an overall view of the scanning system of the present invention. FIG. 2 shows a diagram of the optics of the system of the present invention. FIG. 3 shows a block diagram of the computer utilized in the present system.

FIG. 1—SCANNING SYSTEM

FIG. 1 shows a diagram of a scanning system suitable for use in the present invention. The system of FIG. 1 is discussed briefly here but is discussed in more detail in the co-pending application of B. G. Marks et al., Ser. No. 457,725, filed May 21, 1965, entitled "Method and Apparatus for Scanning." In the system of FIG. 1 an incoming sample of glass or other transparent material 10 is transported by any suitable means in the direction indicated between a mirror 12 and an elongated aperture 14 in an enclosure 16. Enclosure 16 contains means for scanning the sample 10 as it moves in the direction indicated. A light beam 18 from a source (not shown) is projected into tube 20 in which is positioned a condensing lens 22 and a prism 24 (see FIG. 2) in the manner shown. The face 26 of prism 24 is opaque for purposes explained below. The light beam, after refraction by lens 22, continues down tube 20 into enclosure 16. It is reflected from a fixed mirror 18 onto mirrors 27 which are mounted on a rotating platform 28. After reflection from mirrors 27 as indicated, the light beam is transmitted to another set of mirrors 30 which reflect the beam upwardly through aperture 14, the sample 10, and thence to mirror 12. From mirror 12 the light beam is reflected back along its former course through the sample 10, mirrors 30, 27, and 18, and back into tube 20. Since mirrors 27 and 30 are positioned a given distance apart, the beam will make a substantially linear trace across the glass sample 10 as platform 28 rotates. As the sample travels in the direction indicated, the beam will scan the entire surface of the glass.

If the glass sample contains no flaws or surface matter, no light from the return beam projected from enclosure 16 into tube 20 will be transmitted down vertical tube 32 which is attached to tube 20 as indicated. However, as explained below, if any flaws or surface material are present during a particular trace, part of the return beam will be sent down tube 32 where it is detected and analyzed by computer 34.

FIG. 2—OPTICS

Optics of the system of FIG. 1 are diagrammed in FIG. 2 and are explained in detail in the copending application of Allen H. Ett, et al., now Patent No. 3,370,176, granted February 20, 1968, entitled "Radiation Sensitive Means for Detecting Flaws in Radiation-Transmissive Materials." The light from a source 18 is directed toward a condensing lens 16 whose focal length is slightly greater than the distance to mirror 12. Thus the light rays are projected from lens 16, onto the mirrors within enclosure 16 (not shown in FIG. 2) and through glass sample 10 onto mirror 12 and from mirror 12 to sample 10 where they are brought to a focus. Since the center section 38 of lens 16 is stopped or obturated by the opaque face 26 of prism 24, an obturated light ray pattern as indicated at 36 is projected through glass sample 10. When there are no flaws in glass 10, no light in the return beam to lens 16 will reach the center portion 38 of lens 16. However if any flaw or defect is present in the portion of glass sample 10 being scanned, a perturbation or scattering of the incident and return beams will result, causing a light impulse to reach the center portion 38 of lens 16. This light impulse will reach the right hand face of prism 24 and will be internally reflected in the prism and projected downwardly through vertical tube 32 of FIG. 1 where it will be detected and analyzed by computer 34.

FIG. 3—DESCRIPTION OF COMPUTER

In the system of FIG. 3 the light impulse from vertical tube 32 of FIG. 1 is imaged on a half-silvered mirror 102 which reflects a portion of the light impulse onto mirror 104 which in turn reflects the light impulse to a low range photomultiplier tube (PMT) 106. A portion of the light impulse is also transmitted through mirror 102 to a high range photomultiplier tube (PMT) 108. An electrical signal pulse corresponding to the received light impulse is supplied by PMT 106 in parallel to (1) a low level threshold detector 110, (2) a differentiator 112, and (3) one input of a slope detector 114. A similar electrical output pulse from PMT 108 is transmitted to a high level threshold detector 116.

Threshold detector 116 is arranged to supply a pre determined signal at its output lead only when the amplitude of the pulse supplied thereto exceeds a predetermined relatively high voltage, say 100 volts. Threshold detector 110 operates in the same manner except that it provides a predetermined output when the pulse exceeds a predetermined relatively low value, say 0.5 volt.

Differentiator 112 is arranged to provide an output proportional in amplitude to the derivative of the pulse supplied thereto from PMT 106. Differentiator 112 may consist of a differentiating operational amplifier in order to provide unity gain, or alternatively, a series capacitor and a shunt load resistor may be employed if later amplification is supplied. The output of differentiator 112 is coupled in parallel to a medium level threshold detector 118, to a time duration detector 120, and to slope detector 114.

Slope detector 114 is arranged to provide a predetermined output signal only when the leading edge of the pulse from PMT 106 has a relatively gradual slope which does not exceed a predetermined steepness. Slope detector 114 may consist of a simple amplitude comparator which compares the pulse from PMT 106 with the differentiated version of the same pulse from differentiator 112. Since the derivative of a given signal is proportional to its slope, if the signal from differentiator 112 exceeds the amplitude of the direct pulse from PMT 106 or any preselected fraction thereof, this indicates that the slope of the pulse from PMT 106 exceeds a given slope. However if the direct pulse or said preselected fraction thereof exceeds the differentiated signal, this indicates that the slope is less than said given value. The relative gains of slope detector 114 for the differential and direct signals are adjusted to control the slope level at which detector 114 will provide an output. Detector 114 should, of course, be made sensitive to signals of only one polarity.

Time duration detector 120 is arranged to provide an output only when the input signal thereto from differentiator 112 has less than a predetermined width. Since the output signal from PMT 106 will consist of a unipolar pulse, the output of differentiator 112 will consist of positive and negative pulses corresponding in time to the leading and trailing edges of the pulse from PMT 106. Time duration detector 120 may consist of a monostable multivibrator triggered by the positive pulse from differentiator 112 and a two input AND gate arranged to provide an output in response to the simultaneous occurrence of an output from the multivibrator and the negative pulse from differentiator 112. Thus if the pulse from PMT 106 is short enough so that the negative pulse from differentiator 112 occurs during the pulse provided by the monostable multivibrator, the AND gate, and hence detector 120, will provide an output.

Medium threshold detector 118 is arranged to provide a predetermined output if the positive pulse from differentiator 112 exceeds a given threshold, say 5 volts. As indicated by the dashed lines, detector 118 may alternatively be connected directly to the output of PMT 106; however it was found that a more reliable indication was provided when detector 118 was arranged to receive a differentiated input.

A group of five flip flops are connected to the outputs of the three threshold detectors, the time duration detector 120, and the slope detector 114, respectively. Each flip flop will be "set" when its associated detector provides an output.

Flip flop 122, which is set by the output of high level detector 116, includes an indicating means such as an incandescent bulb 122a which is lit whenever flip flop 122 is set. As explained later, water on the surface of glass sample 10 of FIG. 1 will cause flip flop 122 to be set. Flip flop 122 includes an output lead 124 which is energized whenever flip flop 122 is not set; thus lead 124 will be energized whenever surface water is not present on glass sample 10.

Flip flop 126, which also includes an indicator 126a, is set whenever low level threshold detector 110 provides an output. Detector 110 will provide an output whenever any significant input is supplied to PMT 106.

Flip flop 128 is set whenever medium threshold detector 118 provides an output.

Flip flop 130, being connected to the output of detector 120, is set whenever the pulse from PMT 106 has less than a predetermined width. Output 132 of flip flop 130 is therefore energized when the pulse from PMT 106 is "short" (less than a predetermined width), and output 134 is energized when the pulse from PMT 106 is "long" (exceeds the predetermined width).

Flip flop 136 is responsive to the output of slope detector 114. Output 138 of flip flop 136 is energized whenever the slope of a pulse from PMT 106 is "gradual" (less than a predetermined slope) and output 140 is energized whenever the pulse is "steep" (greater than a predetermined slope).

The outputs of flip flops 128, 130 and 136 are connected to AND gates 142, 144, and 146 as indicated. AND gate 142 will provide an output when the pulse from PMT 106 is of medium height or greater and has a width longer than a predetermined duration. AND gate 144 will provide an output whenever the pulse is of medium height or greater and has a gradual slope. AND gate 146 will provide an output whenever the pulse has less than a predetermined duration and has a steep slope. The outputs of these three AND gates are supplied to the single input of another AND gate 148 by way of OR gate 150. The other input of AND gate 148 is connected to output lead 124 from flip flop 122. The output of AND gate 148 is connected to one input of a further AND gate 152.

The output of low level threshold detector 110, in addition to being supplied to flip flop 126, is also supplied to a monostable multivibrator 154. Upon receipt of the output from detector 110, multivibrator 154 will provide an output pulse of a predetermined duration. This output pulse is supplied to the other input of AND gate 152 and to the "IN" terminal of inhibit gate 156. The output of AND gate 152 is supplied to the "INHIBIT" terminal of gate 156 and to the input of flip flop 158.

Inhibit gate 156 will supply at its "OUT" terminal the signal supplied to its IN terminal unless its INHIBIT terminal is energized by the output of AND gate 152. The output of gate 156 is supplied to flip flop 160. Flip flop 160 contains an indicator 160a which is lit whenever flip flop 160 is set. As explained hereinafter, this occurs when dirt is present on the glass sample.

Flip flop 158 provides an indication by way of indicator 158a when energized by AND gate 152, and also supplies an output to a glass marker (not shown) to be described below. Flip flop 158 will be set whenever a flaw in the glass sample is scanned.

There are three flip flop reset sources for the system of FIG. 3: (1) the manual reset source 162 which resets all flip flops in the system; (2) the line reset source 165 which resets three flip flops, i.e., event flip flop 126, dirt indicator flip flop 160, and flow indicator flip flop 158; and (3) the event reset circuit which resets flip flops 122, 128, 130 and 136 in response to the trailing edge of the output of monstable multivibrator 154. Each flip flop in the system has a reset input which is sensitive to a negative voltage only.

The manual reset circuit 162 consists of a negative voltage source 161 connected by way of a momentary contact type switch 163 to the cathodes of two diodes 169. When the switch is depressed (closed), the voltages at the anodes of the two diodes will be lowered momentarily, thereby applying a negative voltage to the reset input of every flip flop in the system. The dual diode circuit is used to isolate the two separate reset lines below reset circuit 162 from each other.

Line reset photocell 165 is arranged to supply a negative reset pulse to the flip flops associated therewith each time the light beam scans a line across the glass sample 10. Line reset photocell 165 may be positioned adjacent the edge of the glass sample so that the scanning beam will actuate it after each line is scanned.

The event reset circuit comprises a differentiating capacitor 164 connecting the output of monostable multivibrator 154 to the inputs of flip flops 122, 128, 130, and 136. Capacitor 164 will supply a negative pulse to the last-mentioned group of flip flops in response to the trailing edge of the output of multivibrator 154.

FIG. 3—OPERATION OF COMPUTER

Each time a flaw within the glass sample 10 or surface dirt or water causes a perturbation of the scanning beam, light will be sent down vertical tube 32 and will be supplied to PMT's 108 and 106. The output pulses from the PMT's are analyzed to determine the nature of the defect. It has been empirically determined that when surface water is present on the glass sample, a very large output pulse will be supplied by PMT's 106 and 108. A flaw in the glass such as a scratch or a bubble will cause PMT 106 to supply either (1) a medium amplitude, long duration output pulse, (2) a medium amplitude output pulse with a gradual slope, or (3) a short duration output pulse with a steep slope.

Assume that flaw is present in the glass sample 10. One or more of AND gates 142, 144, or 146 will provide an output, thereby energizing the lower input of AND gate 148. Since a flaw in the glass will not supply sufficient light to PMT 108 to produce an output from high level detector 116, flip flop 122 will remain unset and lead 124 from flip flop 122 will energize the other input of AND gate 148. With both inputs energized, AND gate 148 will provide an output, energizing the lower input of AND gate 152. The flaw will also cause sufficient light to reach PMT 106 to cause low level detector 110 to actuate monostable multivibrator 154. The setting of monostable multivibrator 154 will cause an output pulse to be supplied to the other input of AND gate 152. AND gate 152 allows the output of AND gate 148 to be supplied to flip flop 158 only for a brief interval as determined by the width of the output pulse from monostable multivibrator 154 after threshold detector 110 is actuated. By thus priming AND gate 152 for a brief interval only after the occurrence of an output from low level threshold detector 110, the probability that spurious signals such as circuit noises or transients will actuate flip flop 158 is reduced greatly. Also AND gate 152 insures that flip flop 158 will not be actuated by a short duration and steep-sloped pulse (which will actuate AND gate 146) unless said pulse also has an amplitude sufficient to actuate low level threshold detector 110.

When the output of AND gate 152 actuates flip flop 158, a flaw indication will be provided. A flip flop 158 will supply an output to a glass marking means (such as a solenoid-operated crayon marker) which will place a highly visible mark on the strip of glass where the flaw was detected. Flip flop 158 will be reset at the end of each scanning line by the output of line reset photocell 165.

Next assume that surface dirt is encountered during a scanning line. The pulse supplied by the PMT's will actuate low level detector 110 and possibly one or two of detectors 118, 120, and 114, but will not be of a nature to cause any of AND gates 142, 144, or 146 to be actuated. Also of course, high level threshold detector 116 will not be actuated. The output of detector 110 will set flip-flop 126 which will provide a "event" indication and will also trigger multivibrator 154. The event bulb 126a is useful in tests and observation of the flow detection system for normal operation. The output of multivibrator 154 will prime AND gate 152, but inasmuch as no flaw is present, the other (bottom) input of AND gate 152 will not be energized and, therefore, the output of AND gate 152 will not actuate the INHIBIT terminal of gate 156. Accordingly the output of multivibrator 154 will pass through gate 156 and will set the dirt indicator flip-flop 160. Flip-flop 160 will be reset at the end of a scanning line by the output of line reset photocell 165.

Next assume that water is present on the surface of the glass during a scan. For this condition high level detector 116 will provide an output and water indicator flip-flop 122 will be actuated. Output lead 124 of flip-flop 122 and, consequently, the ouput of AND gate 148 will not be energized, thereby preventing AND gate 152 from actuating flaw indicator flip-flop 158.

It will be understood that the particular reset means shown is not essential since all resetting and marking can be done manually in response to the appropriate indications. However if the flaws are numerous, it is advantageous to provide an automatic resetting and marking system. Similarly the use of the water indicating circuit (PMT 108, detector 116, flip-flop 122, and AND gate 148) is not necessary if there is little or no possibility that surface water will be present on the glass sample. The same applies to the dirt detection circuit (detector 110, gate 156, and flip-flop 160).

The system has been operated with 95% accuracy in detecting flaws in typical mass produced sheet glass. The low, medium, and high threshold detectors were set to provide an output in the presence of pulses exceeding .5 volt, 5 volts and 100 volts, respectively. The time duration detector 120 was set to provide an output in response to pulses of less than 150 microseconds duration, while the slope detector 114 was set to provide an output in response to pulses of longer than 100 microseconds rise time. The platform 28 of FIG. 1 was rotated at 1800 r.p.m. and the rate of glass travel was arranged so that 60 scans per second were provided, with each scan taking about 4 milliseconds. Monostable multivibrator 154 was arranged to provide an output pulse having a duration of about 200 microseconds.

While there has been described what is at present considered to be the preferred embodiment of the invention it will be apparent that various modifications and other embodiments thereof will occur to those skilled in the art within the scope of the invention. Accordingly, it is desired that the scope of the invention be limited by the appended claims only.

We claim:
1. A device for detecting flaws in a body of substantially transparent material, comprising:
   (a) means for transmitting a beam of radiant energy through said body and scanning said transmitted beam across said body in a direction perpendicular to said beam,
   (b) means for receiving said transmitted beam and for providing an electrical pulse in response to each perturbation of said transmitted beam, the shape of said pulse being determined by the nature of irregularities in said body encountered by said beam, and (c) means for receiving the pulses supplied by said last-named means and providing a predetermined indication whenever the shape of a received pulse is identical to at least one predetermined standard shape or differs therefrom by not more than a predetermined amount.

2. The combination of claim 1 wherein said (c) means is arranged to provide said predetermined indication when the shape of said received pulse either
   (1) falls within a predetermined amplitude range and (a) the width thereof is within a predetermined range or (b) the slope of an edge thereof is within a predetermined range; or
   (2) the slope of an edge thereof and the width thereof are within respective predetermined amplitude ranges.

3. The combination of claim 1 wherein said (a) means is arranged to cause said beam to scan a succession of parallel adjacent traces across a surface of said body.

4. The combination of claim 1 wherein said (b) means comprises a device for converting radiant energy to electrical energy and means for directing radiant energy from said beam to said device only when a perturbation of said beam results from a flaw in or surface material on said body of material.

5. The combination of claim 1 wherein said (c) means also comprises means for providing an indication when the amplitude of a received pulse exceeds a predetermined value.

6. The combination of claim 2 wherein said (c) means is also arranged to provide an indication when said received pulse lies within another predetermined amplitude range but does not satisfy said criteria (1)(a), (1)(b), or (2).

7. The combination of claim 1 wherein said (c) means comprises:
   (1) means arranged to supply a predetermined voltage at a first terminal if the amplitude of an input pulse thereto exceeds a predetermined threshold,
   (2) means arranged to supply a predetermined voltage at a second terminal if the duration of a received pulse is less than a predetermined value and at a third terminal if said duration is greater than a pretetermined value,
   (3) means arranged to supply a predetermined voltage at a fourth terminal if the slope of the leading edge of a received pulse is less than a predetermined steepness and at a fifth terminal if greater than a predetermined steepness,
   (4) three AND gates, a first connected to said first and third terminals, a second connected to said first and fourth terminals, and a third connected to said second and fifth terminals, and
   (5) means for providing said predetermined indication at said predetermined location in response to an output from any of said AND gates unless the amplitude of said received pulse is greater than a second level greater than said predetermined threshold.

8. The combination of claim 1 wherein said (c) means comprises:
   (1) amplitude detection means arranged to provide a predetermined output if the amplitude of an input pulse thereto exceeds a first predetermined value,
   (2) time duration detection means arranged to provide a predetermined output if the width of said pulse is less than a predetermined value,
   (3) slope detection means arranged to provide a predetermined output if the leading edge of said pulse is less than a predetermined steepness,
   (4) first, second, and third flip flops arranged to be set by the outputs of said amplitude, time duration, and slope detection means, respectively, said first flip flop having a set output and said second and third flip flops having set and reset outputs,
   (5) first, second, and third two-input AND gates, the inputs of said first AND gate connected to the set output of said first flip flop and the reset output of said second flip flop, the inputs of said second AND gate connected to the set output of said first flip flop and the set input of said third flip flop, the inputs of said third AND gate being connected to the set input of said second flip flop and the reset input of said third flip flop, and
   (6) means for providing a predetermined response if one or more of said AND gates provide an output and if the amplitude of said pulse does not exceed a second predetermined amplitude greater than a second predetermined value.

9. The combination of claim 8 including means for resetting said flip flops a predetermined time after the occurrence of each of said pulses.

References Cited

UNITED STATES PATENTS

| | | | |
|---|---|---|---|
| 3,202,043 | 8/1965 | Galey et al. | 250—219 |
| 3,321,630 | 5/1967 | Durig et al. | 250—214 |
| 3,361,025 | 1/1968 | Gaffard | 250—219 |

RALPH G. NILSON, Primary Examiner

T. N. GRIGSBY, Assistant Examiner

U.S. Cl. X.R.

250—219, 223; 356—200, 201, 203, 305